United States Patent
Yoshino et al.

(10) Patent No.: US 8,319,388 B2
(45) Date of Patent: Nov. 27, 2012

(54) INDUCTION MOTOR AND HERMETIC COMPRESSOR

(75) Inventors: Hayato Yoshino, Tokyo (JP); Koji Yabe, Tokyo (JP); Kazuhiko Baba, Tokyo (JP); Tomoaki Oikawa, Tokyo (JP); Takahiro Tsutsumi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 110 days.

(21) Appl. No.: 12/742,718

(22) PCT Filed: May 19, 2008

(86) PCT No.: PCT/JP2008/059126
§ 371 (c)(1),
(2), (4) Date: May 13, 2010

(87) PCT Pub. No.: WO2009/093345
PCT Pub. Date: Jul. 30, 2009

(65) Prior Publication Data
US 2010/0247347 A1 Sep. 30, 2010

(30) Foreign Application Priority Data
Jan. 25, 2008 (JP) ................................. 2008-014467

(51) Int. Cl.
*H02K 17/00* (2006.01)
(52) U.S. Cl. ........................................ 310/212
(58) Field of Classification Search .................. 310/212, 310/211, 168, 166, 156.78, 156.81, 125; H02K 17/00, 17/16
See application file for complete search history.

(56) References Cited

U.S. PATENT DOCUMENTS

| | | | | |
|---|---|---|---|---|
| 980,986 A | * | 1/1911 | Meyer | 318/819 |
| 1,650,795 A | * | 11/1927 | Johnson | 164/99 |
| 1,708,909 A | * | 4/1929 | Spencer | 310/212 |

(Continued)

FOREIGN PATENT DOCUMENTS

JP     47-029503 U     12/1972

(Continued)

OTHER PUBLICATIONS

Office Action dated Aug. 25, 2011, issued in the corresponding Chinese Patent Application No. 200880100719.5, and an English Translation thereof.

(Continued)

*Primary Examiner* — Quyen Leung
*Assistant Examiner* — Thomas Truong
(74) *Attorney, Agent, or Firm* — Buchanan Ingersoll & Rooney PC

(57) ABSTRACT

The present invention is directed to provide an induction motor having an ideal efficiency at the normal operation time, while obtaining a high locked-rotor torque without having to use a special drive circuit. According to the induction motor related to the present invention, the induction motor has a rotor 11 having a double squirrel-cage secondary conductor, wherein the rotors 11 includes a rotor core 11a formed by laminating a plurality of electromagnetic steel plates, outer layer slots 40a filled with conductive material, installed along an outer peripheral edge of the rotor core 11a, inner layer slots 40b filled with conductive material, disposed inside of the outer layer slot 40a in the radial direction, and inner peripheral thin bridges 82 made of electromagnetic steel plate, installed in between the outer layer slots 40a and the inner layer slots 40b.

16 Claims, 12 Drawing Sheets

U.S. PATENT DOCUMENTS

| | | | | | |
|---|---|---|---|---|---|
| 1,771,936 | A | * | 7/1930 | Morrill | 310/212 |
| 1,957,551 | A | * | 5/1934 | Nierlich | 310/162 |
| 2,139,748 | A | * | 12/1938 | Harrell | 310/211 |
| 2,292,167 | A | | 7/1940 | Smith | |
| 2,370,458 | A | | 2/1945 | Goran | |
| 3,401,291 | A | | 9/1968 | Lackey | |
| 4,454,438 | A | * | 6/1984 | Yamashita et al. | 310/162 |
| 4,782,260 | A | * | 11/1988 | Gandhi et al. | 310/211 |
| 4,801,832 | A | | 1/1989 | Neumann | |
| 5,182,483 | A | | 1/1993 | Hibino et al. | |
| 5,334,923 | A | | 8/1994 | Lorenz et al. | |
| 5,572,080 | A | * | 11/1996 | Nakamura et al. | 310/211 |
| 5,898,250 | A | | 4/1999 | Sugita et al. | |
| 5,986,366 | A | | 11/1999 | Bailey et al. | |
| 6,058,596 | A | * | 5/2000 | Jansen et al. | 310/211 |
| 6,088,906 | A | | 7/2000 | Hsu et al. | |
| 6,582,207 | B2 | | 6/2003 | Matsumoto et al. | |
| 7,112,908 | B2 | | 9/2006 | Takita et al. | |
| 7,294,949 | B2 | * | 11/2007 | Han et al. | 310/166 |
| 2003/0071533 | A1 | | 4/2003 | Kikuchi et al. | |
| 2003/0102762 | A1 | | 6/2003 | Jansen et al. | |
| 2003/0173861 | A1 | | 9/2003 | Kawaguchi et al. | |
| 2004/0084984 | A1 | * | 5/2004 | Yanashima et al. | 310/156.08 |
| 2004/0119367 | A1 | | 6/2004 | Hiwaki et al. | |
| 2007/0247015 | A1 | | 10/2007 | Dellinger | |
| 2010/0253174 | A1 | | 10/2010 | Yabe et al. | |
| 2011/0081263 | A1 | | 4/2011 | Yoshino et al. | |

FOREIGN PATENT DOCUMENTS

| | | | |
|---|---|---|---|
| JP | 51-071915 | A | 6/1976 |
| JP | 52039106 | A * | 3/1977 |
| JP | 54-148207 | | 11/1979 |
| JP | 54-148207 | A | 11/1979 |
| JP | 56-003559 | A | 1/1981 |
| JP | 58-176540 | U | 11/1983 |
| JP | 59-010159 | A | 1/1984 |
| JP | 60-162434 | A | 8/1985 |
| JP | 61-244248 | A | 10/1986 |
| JP | 62-068468 | U | 4/1987 |
| JP | 62-189929 | A | 8/1987 |
| JP | 63-234850 | A | 9/1988 |
| JP | 64-047565 | U | 3/1989 |
| JP | 1-129738 | A | 5/1989 |
| JP | 2-007771 | U | 1/1990 |
| JP | 02-41672 | U | 3/1990 |
| JP | 3-230740 | A | 10/1991 |
| JP | 04-244762 | A | 9/1992 |
| JP | 05-43753 | U | 6/1993 |
| JP | 06-153471 | A | 5/1994 |
| JP | 08-140319 | | 5/1996 |
| JP | 8-140319 | A | 5/1996 |
| JP | 08-205438 | A | 8/1996 |
| JP | 9-224358 | A | 8/1997 |
| JP | 10-004658 | | 1/1998 |
| JP | 10-004658 | A | 1/1998 |
| JP | 11-299188 | A | 10/1999 |
| JP | 2003-125567 | A | 4/2003 |
| JP | 2003-158839 | A | 5/2003 |
| JP | 2003-333812 | A | 11/2003 |
| JP | 2004-201428 | A | 7/2004 |
| KR | 10-2006-0027707 | A | 3/2006 |
| TW | 340983 | | 9/1998 |
| TW | 571487 | B | 1/2004 |

OTHER PUBLICATIONS

International Search Report (PCT/ISA/210) for PCT/JP2008/059126 dated Aug. 12, 2008.
Office Action from U.S. Patent Office issued in copending U.S. Appl. No. 13/034,229 on Apr. 27, 2011.
Official Action dated Apr. 25, 2011, issued by the Korean Patent Office in corresponding Korean Patent Application No. 10-2010-7007521, and partial English language translation of the Official Action.
Official Action dated Jul. 11, 2011, issued by the US Patent Office in corresponding U.S. Appl. No. 12/744,622.
Hayato Yoshino et al., "Induction Motor and Hermetic Compressor", copending U.S. Appl. No. 12/996,910, filed Dec. 8, 2010.
Koji Yabe et al., "Induction Motor Rotor, Induction Motor, Compressor, Fan, and Air Conditioner", copending U.S. Appl. No. 13/034,229, filed Feb. 24, 2011.
Office Action from U.S. Patent Office issued in copending U.S. Appl. No. 12/744,622 on Mar. 11, 2011.
Office Action (Notice of Rejection) dated Nov. 2, 2010, issued in the copending Japanese Patent Application No. 2009-547920, and an English-language translation thereof.
International Search Report (PCT/ISA/210) for PCT/JP2008/059127 dated Aug. 12, 2008, in copending U.S. Appl. No. 12/744,622 (US 2010/0253174 A1).
International Search Report (PCT/ISA/210) for PCT/JP2008/063986 dated Nov. 18, 2008, in copending U.S. Appl. No. 12/996,910.
Partial English translation of Taiwanese Office Action issued Nov. 9, 2011 in a corresponding Taiwanese application.
Official Action dated Nov. 4, 2011 issued in corresponding U.S. Appl. No. 12/744,622.
Partial translation of JP 8-205438A.
Partial translation of JP 10-4658A.
Notification of Reasons for Refusal issued Dec. 20, 2011 by the Japanese Patent Office in corresponding Japanese Patent Application No. 2009-550418, and English-language translation thereof.
Office Action issued by the Korean Patent Office on Mar. 9, 2012 in corresponding Korean Application No. 10-2011-7000213, and partial English-language translation thereof.
Notice of Reasons for Rejection dated Jun. 12, 2012 issued by the Japanese Patent Office in corresponding Japanese Application No. 2009-550418, and a partial English translation thereof (5 pages).
Second Office Action dated Jun. 4, 2012 issued by the Chinese Patent Office in corresponding Chinese Application No. 200880100719.5, and a partial English translation thereof (17 pages).
Office Action dated Jan. 19, 2012, issued in the corresponding Taiwanese Patent Application No. 097128787, and a partial English Translation thereof. (10 pages).
First Office Action issued by the Chinese Patent Office on Feb. 3, 2012 in corresponding Chinese Application No. 2008801106792, and a partial English-translation thereof.
Cao et al., "Influence of rotor slot and material on IMCCR operating performances", vol. 11, No. 6, No. 2007, and an English translation of portions particularly referred to in the First Office Action issued on by the Chinese Patent Office on Feb. 3, 2012 in corresponding Chinese Application.
Office Action issued by the Japanese Patent Office on Apr. 24, 2012 in corresponding Japanese Application No. 2010-523665, and a partial translation thereof.
Partial English translation of JP 2003-158839A including parts in the Apr. 24, 2012 Japanese Office Action.
U.S. Office Action issued on Sep. 19, 2012 in corresponding U.S. Appl. No. 12/996,910.
Second Office Action dated Sep. 24, 2012, issued in corresponding Chinese Patent Application No. 2008801106791, and a partial English Translation thereof. (14 pages).

* cited by examiner

INDUCTION MOTOR AND HERMETIC COMPRESSOR

FIELD OF THE INVENTION

The present invention relates to an induction motor having a rotor for forming a double squirrel-cage secondary conductor, and a hermetic compressor provided with the induction motor.

BACKGROUND OF THE INVENTION

A rotor of the induction motor is proposed (for example, refer to patent document 1), to reduce eddy current loss of the rotor in which a squirrel-cage conductor is formed by die-casting aluminum into rotor slots. Two types of rotor slots including the inner peripheral side rotor slots and the outer peripheral side rotor slots are arranged in the radial direction of a rotor core, aluminum or an aluminum alloy is filled into only the inner peripheral side rotor slots, and a rotor bar which forms a squirrel-cage conductor is formed. The outer peripheral side rotor slots are formed as empty spaces without fillings, so that a substance having low electric resistance does not exist near the surface of a rotor. As a result, an eddy current is not generated, and a loss due to a PWM (pulse width modulation) can be reduced sharply. Thereby, the efficiency, especially the efficiency in a low load, of a PWM driven induction motor is enhanced.

Another rotor of the double squirrel-cage induction motor is proposed (for example, patent document 2), having a slot portion which includes two types of outer slots (large and small), both are the same in numbers, which are arranged alternately and concentrically along an outer peripheral edge of the rotor at equal intervals in parallel with the rotation axis, and inner slots which extend internally in the radial direction, being continuous to an inner end of the small slots of the outside slots radially. The inner slots are projected circumferentially at the intermediate section, and the cross-sectional area increases remarkably.

Patent document 1: Japanese Laid-Open Patent Publication No. HEI 08-140319

Patent document 2: Japanese Laid-Open Patent Publication No. HEI 01-129738

Problems to be Solved by the Invention

However, as for the induction motor mentioned in the patent document 1 above, aluminum is not filled into the rotor slots of the outer peripheral side of the rotor. Therefore, a sufficient locked-rotor torque cannot be acquired during starting of the induction motor without a special driving circuit such as an inverter.

Moreover, the induction motor mentioned in the patent document 2, large outside slots that are not connected to the inside slots are disposed in positions that hinder a main magnetic flux. Therefore, an electric current of the induction motor during operation time increases, and an efficiency of the induction motor deteriorates.

The present invention is directed to an induction motor and a hermetic compressor using this induction motor having an ideal efficiency during normal operation, and acquiring a high locked-rotor torque without having to use a special driving circuit.

Means to Solve the Problems

According to an induction motor having a rotor for forming a double squirrel-cage secondary conductor, wherein the rotor comprises:

a rotor core which is formed by laminating a plurality of electromagnetic steel plates;

outer layer slots which are filled with an electro-conductive material, and which are mounted along an outer peripheral edge of the rotor core;

inner layer slots which are filled with an electro-conductive material, and which are disposed at an inner side of the outer layer slots in the radial direction, and inner peripheral thin bridges made from the electromagnetic steel plate, which are disposed in between the outer layer slots and the inner layer slots.

The outer layer slots have a rectangular shape in which a dimension in the circumferential direction is longer than a dimension in the radial direction.

According to the induction motor of the present invention, the inner peripheral thin bridges have an approximately constant radial thickness, in the circumferential direction of the rotor.

According to the induction motor of the present invention, the outer peripheral thin bridges have an approximately constant radial thickness, in the circumferential direction of the rotor, by forming the outer peripheral thin bridges at an outer peripheral side of the rotor core of the outer layer slots.

According to the induction motor of the present invention, the outer layer slots are made into an open slot type by forming openings to the outer peripheral thin bridges for connecting to outside.

According to the induction motor of the present invention, the double squirrel-cage secondary conductor has end rings at both end faces of the rotor core in a laminated direction, and a step is provided to a cross-sectional shape of the end rings in a vertical direction.

According to the induction motor of the present invention, the double squirrel-cage secondary conductor has outer layer conductor bars placed inside of the outer layer slots, and inner layer conductor bars placed inside of the inner layer slots, wherein a part of the end ring connected to the outer layer conductor bars is low in height, and a part of the end ring connected to the inner layer conductor bars is high in height.

According to the induction motor of the present invention, the double squirrel-cage secondary conductor has the outer layer conductor bars placed inside of the outer layer slots, and the inner layer conductor bars placed inside of the inner layer slots, comprises an outer layer end ring for the outer layer conductor bars, and an inner layer end ring for the inner layer conductor bars.

According to the induction motor of the present invention, an electro-conductive material configuring the inner layer conductor bars is low in resistance than an electro-conductive material configuring the outer layer conductor bars.

According to the induction motor of the present invention having a rotor for forming a double squirrel-cage secondary conductor, wherein the rotor comprises:

a rotor core which is formed by laminating a plurality of electromagnetic steel plates;

outer layer slots which are filled with an electro-conductive material, and which are mounted along an outer peripheral edge of the rotor core;

inner layer slots which are filled with an electro-conductive material, and which are disposed at an inner side of the outer layer slots in the radial direction, and inner peripheral thin bridges made from the electromagnetic steel plate, which are disposed in between the outer layer slots and the inner layer slots; and wherein an angle between side faces of the outer layer slots and a center of the rotor is greater than an angle between adjoining side planes of the outer layer slots and a center of the rotor.

According to the induction motor of the present invention having a rotor for forming a double squirrel-cage secondary conductor, wherein the rotor comprises:

a rotor core which is formed by laminating a plurality of electromagnetic steel plates;

outer layer slots which are filled with an electro-conductive material, and which are mounted along an outer peripheral edge of the rotor core;

inner layer slots which are filled with an electro-conductive material, and which are disposed at an inner side of the outer layer slots in the radial direction, and inner peripheral thin bridges made from the electromagnetic steel plate, which are disposed in between the outer layer slots and the inner layer slots; and wherein the inner layer slots are disposed inside of an angle between the side faces of the outer layer slots and a rotor center.

According to the induction motor of the present invention, a number of the outer layer slots is more than a number of the inner layer slots.

According to the induction motor of the present invention, a hermetic compressor is provided.

Effects of the Invention

According to the induction motor of the present invention, based on the configuration described above, a locked-rotor torque is increased while obtaining a highly-efficient induction motor during the normal operation.

DETAILED DESCRIPTION OF THE EMBODIMENTS

First Embodiment

Hereinbelow, the first embodiment is described with reference to the drawings. FIGS. 1 to 6 illustrate the first embodiment. FIG. 1 is a horizontal cross-sectional view of the induction motor 100. FIG. 2 is a horizontal cross-sectional view of a rotor 11 of the induction motor 100. FIG. 3 is a perspective view of the rotor 11 of the induction motor 100. FIGS. 4 to 6 are enlarged views of rotor slots 40 of the rotor 11 of the induction motor 100.

The induction motor 100 shown in FIG. 1 is a two-pole single-phase induction motor. The induction motor 100 includes a stator 12 and a rotor 11.

The stator 12 includes a stator core 12a, a main winding coil 20b and an auxiliary winding coil 20a which are inserted to a stator slot 12b of the stator core 12a. Further, an insulation material (such as slot cell, wedge) is inserted to the stator slot 12b for securing insulation between a winding coil (the main winding coil 20b and the auxiliary winding coil 20a) and the stator core 12a, however the description is omitted herein.

The stator core 12a is manufactured by die-cutting an electromagnetic steel plate having a thickness of 0.1 to 1.5 mm into a predetermined shape, by laminating a predetermined number in the axial direction, and by fixing with stacking or welding.

Stator slots 12b are formed along an inner peripheral edge of the stator core 12a. The stator slots 12b are disposed at equal intervals in the circumferential direction. The stator slots 12b are extended in the radial direction. The stator slots 12b are open to the inner peripheral edge. Winding coils (the main winding coil 20b and the auxiliary winding coil 20a) are inserted from these openings. In the example of FIG. 1, the stator core 12a includes twenty-four stator slots 12b.

Notches 12c are formed by linearly cutting a circular outer peripheral edge of the stator core 12a at four locations. Adjoining notches 12c of the four locations are disposed perpendicular to one another.

In case of utilizing the induction motor 100 of FIG. 1 to the hermetic compressor, the stator 12 is shrink fitted to an inner periphery of circular hermetically sealed container of the hermetic compressor. A refrigerant passes through the induction motor 100 at inside of the hermetic compressor. Because of this, a refrigerant flow path is required in the induction motor 100. The refrigerant flow path is formed in between the stator 12 and the hermetically sealed container by installing the notches 12c. As the refrigerant flow path of the induction motor 100, besides the notches 12c at an outer peripheral plane of this stator core 12a, for example, there is an air hole of the rotor 11, or a gap in between the stator 12 and the rotor 11.

The winding coil 20 is inserted to the stator slot 12b. The winding coil 20 includes the main winding coil 20b and the auxiliary winding coil 20a.

The main winding coil 20b is a coil having a concentric winding method. In the example of FIG. 1, the main winding coil 20b is disposed inside of the stator slot 12b (rotor 11 side). In this example, the main winding coil 20b having the concentric winding method is made of five coils with different sizes (especially a length in peripheral direction). Then, the main winding coil 20b is inserted to the stator slot 12b so that centers of the five coils are set in the same position. For this reason, it is called the concentric winding method.

The main winding coil 20b can either be disposed inside or outside of the stator slot 12b. If the main winding coil 20b is disposed inside of the stator slot 12b, compared to the case in which the main winding coil 20b is disposed outside of the stator slot 12b, a coil length becomes shorter. Likewise, if the main winding coil 20b is disposed inside of the stator slot 12b, compared to the case in which the main winding coil 20b disposed outside the stator slot 12b, a leakage magnetic flux becomes less. Thus, if the main winding coil 20b is disposed inside of the stator slot 12b, compared to the case in which the main winding coil 20b is disposed outside of the stator slot 12b, an impedance of the main winding coil 20b (resistance value, leakage reactance) becomes less. Therefore, a performance characteristic of the induction motor 100 is improved.

A magnetic flux of the main winding coil is generated by flowing an electric current to the main winding coil 20b. A direction of the magnetic flux of the main winding coil is up and down direction of FIG. 1. Number of winding turns of the five coils of the main winding coil 20b are selected so that a waveform of the magnetic flux of the main winding coil becomes a sine wave as much as possible. The electric current that flows through the main winding coil 20b is an alternating current, therefore, the magnetic flux of the main winding coil also changes size and direction depending on the electric current.

Also, similar to the main winding coil 20b, the auxiliary winding coil 20a having the concentric winding method is inserted to the stator slot 12b. In FIG. 1, the auxiliary winding coil 20a is disposed outside of the stator slot 12b. A magnetic flux of the auxiliary winding coil is generated by flowing the electric current through the auxiliary winding coil 20a. A direction of the magnetic flux of this auxiliary winding coil is orthogonal to the direction of the magnetic flux of the main winding coil (right and left direction of FIG. 1). Since the electric current flowing through the auxiliary winding coil 20a is an alternating current, the magnetic flux of the auxiliary winding coil also changes size and direction depending on the electric current.

In general, the main winding coil 20b and the auxiliary winding coil 20a are inserted to the stator slot 12b so that an electrical angle between the magnetic flux of the main winding coil and the magnetic flux of the auxiliary winding coil is 90 degrees (the number of poles is two in this example, so that a mechanical angle is also 90 degrees).

In the example of FIG. 1, the auxiliary winding coil 20a is made of three coils having different sizes (especially the length in peripheral direction). Then, the auxiliary winding coil 20a is inserted to the stator slot 12b so that the centers of the three coils are set in the same position.

The number of winding turns of the three coils of the auxiliary winding coil 20a are selected so that a waveform of the magnetic flux of the auxiliary winding coil becomes a sine wave as much as possible.

The main winding coil 20b is connected in parallel to a circuit that connects a running capacitor (not illustrated) in series with the auxiliary winding coil 20a. By connecting the running capacitor in series with the auxiliary winding coil 20a, a phase of the electric current flowing through the auxiliary winding coil 20a can be proceeded further than a phase of the electric current flowing through the main winding coil 20b.

A rotating magnetic field is generated by shifting positions of the main winding coil 20b and the auxiliary winding coil 20a in the stator core 12a with the electrical angle of 90 degrees, and by differing the phases of the electric currents of the main winding coil 20b and the auxiliary winding coil 20a.

Moreover, the rotor 11 includes a rotor core 11a and a double squirrel-cage secondary conductor. Just like the stator core 12a, the rotor core 11a is manufactured by die-cutting the electromagnetic steel plate having a thickness of 0.1 to 1.5 mm into a predetermined shape, and by laminating in the axial direction.

Generally, the rotor core 11a is manufactured by die-cutting a material which is the same material as the stator core 12a, however, the rotor core 11a and the stator core 12a can be made from different materials.

The rotor core 11a has a double squirrel-cage rotor slot 40 which includes outer layer slots 40a disposed along an outer peripheral edge of the rotor core 11a, and inner layer slots 40b disposed inside of the outer layer slots 40a (see FIG. 2).

Aluminum serving as an electro-conductive material is cast in the outer layer slots 40a and the inner layer slots 40b, and together with end rings 32 disposed on edge faces of a laminated direction of the rotor 11, a double squirrel-cage secondary conductor is formed (see FIG. 3). Aluminum is cast in the outer layer slots 40a to form outer layer aluminum bars 30a (one example of outer layer conductor bars). Also, aluminum is cast in the inner layer slots 40b to form inner layer aluminum bars 30b (one example of inner layer conductor bars). An aluminum bar 30 includes an outer layer aluminum bar 30a and an inner layer aluminum bar 30b. In general, the aluminum bars 30 and the end rings 32 are manufactured by casting aluminum at the same time by die casting.

According to the rotor 11 of FIG. 1, the outer layer slots 40a and the inner layer slots 40b forming a double squirrel-cage shape, are separated by inner peripheral thin bridges 82 made from the electromagnetic steel plate (see FIG. 4). The outer layer aluminum bars 30a and the inner layer aluminum bars 30b disposed inside of the rotor slot 40 are electrically connected by the end rings 32.

As a general characteristic of the induction motor 100 having a double squirrel-cage rotor 11, a slip frequency (a difference between a frequency of the rotating magnetic field and a rotation number of the rotor 11) increases at starting time. A leakage magnetic flux of the inner layer aluminum bars 30b becomes more than a leakage magnetic flux of the outer layer aluminum bars 30a. At the starting time when the slip frequency is large, an electric current distribution is determined based on an amount of reactance, and a secondary current mainly flows to the outer layer aluminum bars 30a. For this reason, an starting characteristic is improved.

Also, the slip frequency is low at a normal operation time, so that the secondary current flows through both the outer layer aluminum bars 30a and the inner layer aluminum bars 30b, and thereby a secondary resistance becomes small. Thus, based on a fact that a secondary copper loss becomes low, a property of a highly-efficient motor is realized. Also, a single-phase induction motor driven by a single-phase alternate current source tends to have a lower locked-rotor torque as compared with a three-phase induction motor driven by a three-phase alternating current source.

In the present embodiment, the outer layer slots 40a and the inner layer slots 40b are separated by the inner peripheral thin bridges 82. For this reason, the magnetic flux readily flows to the inner peripheral thin portions 82 at the starting time, and the secondary current is flown through the outer layer aluminum bars 30b only, so that even higher locked-rotor torque can be acquired.

An increasing locked-rotor torque means that the same locked-rotor torque is acquired at a low power source voltage. That is, if for some reason a power source voltage becomes low, the induction motor can still be started, and a highly-reliable induction motor is acquired.

As another method of increasing the locked-rotor torque, there is the method of increasing a capacity of the running capacitor connected in series with the auxiliary winding coil 20a of the single-phase induction motor. Also, there are methods for performing measures at an external circuit of the single-phase induction motor, such as installing an starting capacitor and a relay in parallel with the running capacitor. However, these methods involve higher costs. Since no special external circuit is being used in the present embodiment, therefore, the single-phase induction motor which is low in cost is acquired as an operation system including a circuit such as running capacitor.

Also, the outer layer slots 40a have a rectangular shape, with a dimension in the circumferential direction being longer than a dimension in the radial direction. Outer peripheral thin bridges 81 having approximately a constant radial thickness are formed in the rotor core 11a at an outer periphery of the outer layer slots 40a. If the outer layer slots 40a are made into a circular shape, portions of the outer peripheral thin bridges 81 (outside portion of a circle center) can be made thin, however, portions of the outer peripheral thin bridges 81 distant from the circle center become thick. At the staring time of the induction motor, since the magnetic flux flows through an outer peripheral surface of the rotor, so that if the outer peripheral thin portions 81 become thick, the leakage magnetic flux to the outer peripheral thin bridges 81 is increased, which decreases the magnetic flux linked to the outer layer slots 40a, and the secondary current will not effectively flow to the outer layer slots 40a, and thereby causing a problem of decreasing locked-rotor torque.

In this example, the outer layer slots 40a are made to have a rectangular shape in the circumferential direction, at the same time as making the outer peripheral thin bridges 81 thin with approximately a constant thickness. Due to this, the leakage magnetic flux to the outer peripheral thin portions 81 at the starting time decreases, the magnetic flux flows to the inner peripheral thin portions 82, and the linkage magnetic flux to the outer layer slots 40a increases, the secondary current effectively flows to the outer layer slots 40a, and a high locked-rotor torque is acquired.

The thickness of the outer layer thin bridges 81 must be made to secure a strength against a centrifugal force during rotation. Also, by considering the fact of acquiring the high locked-rotor torque from making the outer layer thin bridges 81 thin within a manufacturing possible range, the thickness of the outer layer thin bridges 81 is ideally 0.1 to 1.5 mm which is the thickness of the electromagnetic steel plate that constitutes the rotor core 11a.

As shown in FIG. 4, an angle between two side faces of the outer layer slots 40a and a rotor center is θ1, and an angle between side faces of adjoining outer layer slots 40a is θ2. According to the configuration of the present embodiment, θ1>θ2, and the inner layer slots 40b are configured so that the outer layer slots 40a settle within the angle θ1 between the two side faces of the outer layer slots 40a and the rotor center. Owing to this, a highly-efficient induction motor 100 at the normal operation time is implemented while securing the locked-rotor torque.

In order to increase the locked-rotor torque, it is effective to reduce cross-sectional areas of the outer layer slots 40a and to increase the secondary resistance. However, in order to carry out a highly-efficient motor at the normal operation time, there is a need to reduce the secondary copper loss by reducing the secondary resistances of both the outer layer slots 40a and the inner layer slots 40b.

The locked-rotor torque is increased by reducing the cross-sectional areas of the outer layer slots 40a by making θ1 small. However, if the cross-sectional areas of the outer layer slots 40a become small, the secondary resistance at the normal operation becomes high. It is possible to increase cross-sectional areas of the inner layer slots 40b by lengthening the inner layer slots 40b toward a rotor center direction. However, slot widths are thinned at the center direction, so that in order to obtain an ideal cross-sectional area, the inner layer slots 40b approach to the shaft hole 31. If the inner layer slots 40b lengthen, a length of face portion having a high magnetic flux density in the rotor 11 becomes long, and the efficiency may deteriorate. If the rotor 11 is mounted to the hermetic compressor, the air hole used as the refrigerant flow path may be installed near the rotor axis. However, the magnetic flux density becomes high as the inner layer slots 40b approach the air hole, and thereby causing the problem of efficiency deterioration.

Further, if slot widths in the center direction of the rotor 11 become thin, when aluminum is cast in by die casting, aluminum will not flow easily to a central side of the inner layer slots 40b of the rotor 11. As a result of this, the secondary resistance cannot be lowered, and there is a likelihood of deteriorating the efficiency.

As another method, horizontal widths of the inner layer slots 40b (circumferential direction) are increased to obtain the desired cross-sectional area. However, an increase in the horizontal widths of the inner layer slots 40b indicates that a face width c serving as a magnetic flux path (see FIG. 4) at the normal operation time becomes thin. If the face width c becomes thin, a magnetic resistance is increased, and necessary electric current for obtaining the torque at the normal operation time is increased, and the efficiency of the induction motor 100 may deteriorate.

In the present embodiment, the horizontal widths of the outer layer slots 40a are increased over the horizontal widths of the inner layer slots 40b. Because the outer layer slots 40a are situated at an outer side of the rotor core 11a, slot areas are increased just by slightly increasing the horizontal widths, making it capable of lowering the secondary resistance at the normal operation time. However, the secondary resistance at the starting time is also lowered, and the locked-rotor torque may also be low. In the present embodiment, since the inner peripheral thin bridges 82 are provided in between the outer layer slots 40a and the inner layer slots 40b, the secondary current is effectively flown to the outer layer slots 40a, at the starting time, and the locked-rotor torque is improved, at the same time, an efficiency of the motor at the normal operation time is also effectively improved.

As illustrated in FIG. 4, provided that a denotes widths of the inner peripheral thin bridges 82 in the radial direction, and b denotes dimensions from outer peripheral side end portions of the outer layer slots 40a of the rotor to inner peripheral side end portions of the inner layer slots 40b of the rotor, and by setting b>5a, the locked-rotor torque is increased, at the same time, a highly-efficient induction motor 100 at the normal operation time is possible.

As illustrated in FIG. 5, just like the outer peripheral thin bridges 81, the inner peripheral thin bridges 82 are ideally thinned at approximately a constant radial thickness. At the starting time, the locked-rotor torque is improved by allowing the magnetic flux to flow to the inner peripheral thin bridges 82. However, if the magnetic flux leaks to the inner peripheral thin bridges 82 at the normal operation time, the magnetic flux links mostly to the outer layer slots 40a, and the magnetic flux that links to the inner layer slots 40b becomes less. As a result, the efficiency declines due to an increase in the secondary resistance. Hence, it is not advantageous to increase the widths a of the inner peripheral thin bridges 82 in the radial direction.

In the present embodiment, since the widths a of the inner peripheral thin bridges 82 in the radial direction are decreased, the leakage magnetic flux to the inner peripheral thin bridges 82 at the normal operation time can be reduced. As a result of this, a highly-efficient induction motor is obtained. Although it is ideal to decrease the widths a of the inner peripheral thin bridges 82 in the radial direction within the manufacturing possible range, however, if these are decreased too much, the magnetic flux may not link to the outer layer slots 40a under a high slip frequency state of the starting time. For this reason, an ideal width of the widths a of the inner peripheral thin bridges 82 in the radial direction is about 1 to 3 times the thickness of the electromagnetic steel plate that constructs the rotor core 11a.

Also, in the present embodiment, imaginary circles that pass through approximately the centers of the outer peripheral thin bridges 81 in the radial direction, and imaginary circles that pass through approximately the centers of the inner peripheral thin portions 82 in the radial direction are concentric. Alternatively, as illustrated in FIG. 6, the inner peripheral thin bridges 82 can be formed to have inclination against the rotor core 11a in the circumferential direction. If the inner peripheral thin bridges 82 are inclined, as long as the rotor 11 rotates in a single direction (counterclockwise direction in FIG. 6), the leakage magnetic flux will effectively flows to the inner peripheral thin bridges 82 at the starting time. Further, the locked-rotor torque can be improved.

In the present embodiment, aluminum is used as a secondary conductor material. Any conductive material may be used such as copper. Alternatively, aluminum is cast in by die casting, after inserting a rod-shaped copper material to the inner layer slots 40b. Alternatively, aluminum is cast in the outer layer slots 40a and the inner layer slots 40b by die casting after disposing a disc-shaped copper having holes into the end ring unit 32.

Although the winding coil 20 (the main winding coil 20b and the auxiliary winding coil 20a) inserted to the stator slot 12b is the winding coil having the concentric winding method, however, the similar effect can also be obtained for a lap winding and a wave winding.

Although the single-phase induction motor driven by the single-phase alternating current source has been described, however, the similar effect can also be obtained for the three-phase induction motor driven by the three-phase alternating current source by inserting a three-phase winding coil to the stator slot 12b.

In the present embodiment, four notches 12c are provided to the outer peripheral face of the stator core 12a, however, more notches can be provided, alternatively, a cylindrical-shaped stator core 12a without a notch 12c can also be used.

According to the present embodiment, the following effects are obtained.

(1) The outer layer slots 40a and the inner layer slots 40b are separated by the inner layer thin bridges 82, therefore, the magnetic flux easily flows to the inner periphery thin bridges 82 at the starting time, and the secondary current is flown to the outer layer aluminum bars 30a only, so that even higher locked-rotor torque is obtained.

(2) The outer layer slots 40a are made to have a rectangular shape in the circumferential direction, at the same time, by making the thickness of the outer peripheral thin bridges 81 approximately constant, the magnetic flux flows to the inner peripheral thin bridges 82 at the starting time, the magnetic flux link to the outer peripheral slots 40a increases, and the secondary current effectively flows to the outer layer slots 40a, and the high locked-rotor torque is obtained.

(3) According to the present configuration, the angle θ1 between two side faces of the outer layer slots 40a and the rotor center, and the angle θ2 between the side faces of the adjoining outer layer slots 40a, are set to θ1>θ2, as well, the inner layer slots 40b settle within the angle θ1 of the outer layer slots 40a. In this way, the highly-efficient induction motor 100 at the normal operation time is realized while securing the locked-rotor torque.

(4) A relationship between the widths a of the inner peripheral thin bridges 82 in the radial direction and the dimensions b from the outer peripheral side end portions of the outer layer slots 40a of the rotor to the rotor inner peripheral side end portions of the inner layer slots 40b of the rotor are set to b>5a. In this way, the highly-efficient induction motor 100 at the normal operation time is possible while increasing the locked-rotor torque.

(5) Ideally, the widths a of the inner peripheral thin bridges 82 in the radial direction are decreased within the manufacturing possible range, however, if the widths are decreased too much, the magnetic flux may not link to the outer layer slots 40a even in a situation of high slip frequency at the starting time. For this reason, the widths a of the inner peripheral thin bridges 82 in the radial direction are ideally 1 to 3 times the thickness of the electromagnetic steel plate which constitutes the rotor core 11a.

(6) The inner peripheral thin portions 82 are inclined against the circumferential direction of the rotor core 11a. If the rotor 11 rotates in one direction, the leakage magnetic flux can effectively flows to the inner peripheral thin bridges 82 at the starting time, making it capable to improve the locked-rotor torque further.

Second Embodiment

Hereinbelow, the second embodiment is described with reference to the drawings. FIG. 7 is an enlarged view of the rotor slot 40 of the rotor 11 of the induction motor 100, in accordance with the second embodiment.

As illustrated in FIG. 7, parts of the outer peripheral thin bridges 81 at outside of the outer layer slots 40a are opened to form an opening portion 40a-1. The outer layer slots 40a are made into an open-slot type.

The magnetic flux flows through the outer peripheral surface of the rotor 11 at the starting time of the induction motor 100. A part of the leakage magnetic flux flows to the outer peripheral thin bridges 81 when the outer peripheral thin bridges 81 are provided. By making the outer layer slots 40a the open-slot type, the leakage magnetic flux to the outer peripheral thin bridges 81 is greatly reduced, and more magnetic flux flows to the inner peripheral thin bridges 82. For this reason, the secondary current flow to the outer layer slots 40a at the starting time increases, and the locked-rotor torque can be increased.

Aluminum can either be filled or unfilled to opening parts 40a-1. If aluminum is unfilled to the opening parts 40a-1, after laminating the rotor core 11a providing the outer peripheral thin bridges 81, there is a method of implementing a mechanical processing to form the opening parts 40a-1 after die casting with aluminum.

If aluminum is filled in the opening parts 40a-1, aluminum enters the opening parts 40a-1 by performing die casting after laminating the rotor core 11a having the open-slot shape from the beginning. However, in this method, aluminum is leaked from the opening parts 40a-1 during die casting. There is a method of performing the die casting after attaching cylindrical cases to the outer peripheral portions of the rotor core 11a. If aluminum is still leaking, the outer periphery of the rotor 11 is processed by cutting after the die casting.

As an effect of not filling an aluminum to the opening parts 40a-1, the cylindrical cases at the time of die casting is not required. If aluminum is filled to the opening parts 40a-1, the cross-sectional areas of the outer layer slots 40a are enlarged equivalently. Owing to this, the secondary resistance at the normal operation time is lowered, which is effective in implementing the high efficiency.

According to the present embodiment, the following effects are obtained.

(1) Parts of the outer peripheral thin bridges 81 are made to have the opening parts 40a-1, and the leakage magnetic flux to the outer periphery thin bridges 81 is greatly reduced, more magnetic flux flows to the inner peripheral thin bridges 82, and the secondary current flow to the outer layer slots 40a at the starting time increases, and the locked-rotor torque increases.

(2) If aluminum is filled into the opening parts 40a-1, the cross-sectional areas of the outer layer slots 40a enlarges equivalently, and the secondary resistance at the normal operation time is lowered, and a high-efficiency motor can be obtained effectively.

Third Embodiment

Hereinbelow, the third embodiment of the present invention is described with reference to the drawings. FIG. 8 is a horizontal cross-sectional view of the rotor 11 of the induction motor 100, in accordance with the third embodiment. FIG. 9 is an enlarged view of the rotor slot 40 of the rotor 11 of the induction motor 100, in accordance with the third embodiment.

As illustrated in FIGS. 8 and 9, more outer layer slots 40c are arranged than the inner layer slots 40b. In the example of the present embodiment, a number of the outer layer slots 40c is twice a number of the inner layer slots 40b.

At the starting time of the induction motor 100, as described previously, the slip frequency is higher, therefore, more magnetic flux flows to the outer peripheral surface of the rotor 11. The locked-rotor torque is increased by linking the magnetic flux flow of the outer peripheral surface more effectively to the outer layer slots 40c.

In the present embodiment, the number of the inner layer slots 40b is made twice the number of the outer layer slots 40c. In this way, the leakage magnetic flux flow of the outer peripheral surface of the rotor 11 at the starting time is effectively linked to the inner layer slots 40b, and the locked-rotor torque is increased.

The outer layer slots 40c having increased the number of slots can be disposed at equal intervals against the circumferential direction, however, if the outer layer slots 40c are arranged on a face width center, the main magnetic flux flow at the normal operation time is hindered, and the efficiency declines due to an increase in the electric currents. In such cases, positions of the outer layer slots 40c are arranged by slightly offsetting from a center line of the face width, so that a hindrance of the main magnetic flux flow is prevented, and a highly-efficient induction motor 100 can be obtained.

The present embodiment describes the case in which the number of the outer layer slots 40c is made twice the number of the inner layer slots 40b, however, the same effect can be obtained as long as the number of the outer layer slots 40c is more than the number of the inner layer slots 40b. The present embodiment describes the case in which sizes of all the outer layer slots 40c are the same, however, their sizes can be varied and still the same effect is obtained.

Further, least common multiples of the number of the inner layer slots 40b and the number of the outer layer slots 40c are set so that their respective numerical values are high. In this way, vibration and noise occurring from slots combination are effectively reduced.

According to the present embodiment, the following effects are obtained.
(1) The number of the inner layer slots 40b is made twice the number of the outer layer slots 40c. In this way, the leakage magnetic flux flow to the outer peripheral surface of the rotor 11 at the stating time is effectively linked to the inner layer slots 40b, and the locked-rotor torque is increased.
(2) The positions of the outer layer slots 40c are arranged by slightly offsetting from the center line of the face width. In this way, the hindrance of the main magnetic flux flow is prevented, and a highly-efficient induction motor 100 is obtained.
(3) The least common multiples of the outer layer slots 40c and the inner layer slots 40b are set so that their respective numerical values are high. In this way, vibration and noise occurring from slots combination are effectively reduced.

Fourth Embodiment

Hereinbelow, the fourth embodiment is described with reference to the drawings. FIGS. 10 to 12 are partial vertical cross-sectional views of the rotor 11 of the induction motor 100, in accordance with the fourth embodiment.

A characteristic of the rotor 11 of the present embodiment is providing a step to a cross-sectional shape of the end ring 32.

The characteristic of the induction motor 100 having the double squirrel-cage rotor 11 is an increase in the locked-rotor torque and the highly-efficient motor at the normal operation time are both possible by changing the secondary resistance at the starting time and the normal operation time. Even if a difference in the secondary resistance is prepared by shaping the outer layer slots 40a and the inner layer slots 40b, that is, by shaping the outer layer aluminum bars 30a and the inner layer aluminum bars 30b, the respective aluminum bars (the slot outer layer aluminum bar 30a and the inner layer aluminum bar 30b) are connected by the end rings 32. For this reason, the secondary resistance at the starting time is lowered, and a high locked-rotor torque may not be obtained.

In the present embodiment, step-shaped end rings 32 can increase the secondary resistance at the starting time, and the induction motor 100 with increased locked-rotor torque is obtained.

As an example of the step-shaped end rings that can exhibit effectiveness, as illustrated in FIG. 10, a height of the end ring 32 at a portion connecting to the outer layer aluminum bar 30a is lowered, and a height of the end ring 32 at a portion connecting to the inner layer aluminum bar 30b is made higher.

Further, as illustrated in FIG. 11, an inclination having gradually increased an outside height of the end ring 32 connected to the inner layer aluminum bar 30b may be installed. Further effectiveness is exhibited.

Further, as illustrated in FIG. 12, the end ring 32 may be separated at a part of the outer peripheral thin bridges 81 serving as a boundary between the outer layer aluminum bar 30a and the inner layer aluminum bar 30b. That is, an outer layer end ring 101 for the outer layer aluminum bar 30a and an inner layer end ring 102 for the inner layer aluminum bar 30b are respectively installed. In this way, the locked-rotor torque is improved further.

As with the case of FIG. 12, the outer layer aluminum bar 30a and the inner layer aluminum bar 30b are not connected to one another by the end ring 32, therefore, when the die casting is performed, there is a need to cast in the conductive material separately to the outer layer slots 40a and the inner layer slots 40b. The same material can be used, however, a high-resistance material such as aluminum is used for the outer layer aluminum bar 30a, and a low-resistance material such as copper is used for the inner layer aluminum bar 30b, in order to exhibit a better effect. By varying the materials in use for the outer layer aluminum bar 30a and the inner layer aluminum bar 30b, both the characteristics of an improved locked-rotor torque and a highly efficient motor at the normal operation time can be realized.

According to the present embodiment, the following effects are obtained.
(1) The step-shaped end ring 32 can increase the secondary resistance at the starting time, to obtain the induction motor 100 with an increased locked-rotor torque.
(2) The height of the end ring 32 at the portion connecting to the outer layer aluminum bar 30a is lowered, and the height of the end ring 32 at the portion connecting to the inner layer aluminum bar 30b is set higher. In this way, the better effect can be exhibited.
(3) The inclination that gradually increases the outer height of the end ring 32 connected to the inner layer aluminum bar 30b can be installed. Further effect can be exhibited.
(4) The outer layer end ring 101 of the outer layer aluminum bar 30a and the inner layer end ring 102 of the inner layer aluminum bar 30b are respectively installed, so that the locked-rotor torque can be improved further.
(5) A high-resistance material, such as aluminum, is used for the outer layer aluminum bar 30a, and a low-resistance material, such as copper, is used for the inner layer aluminum bar 30b. By varying the materials in use for the outer layer aluminum bar 30a and the inner layer aluminum bar 30b, both the characteristics of the improved locked-rotor torque and the highly-efficient motor at the normal operation time can be realized.

Explanation of Signs

Figure 1:
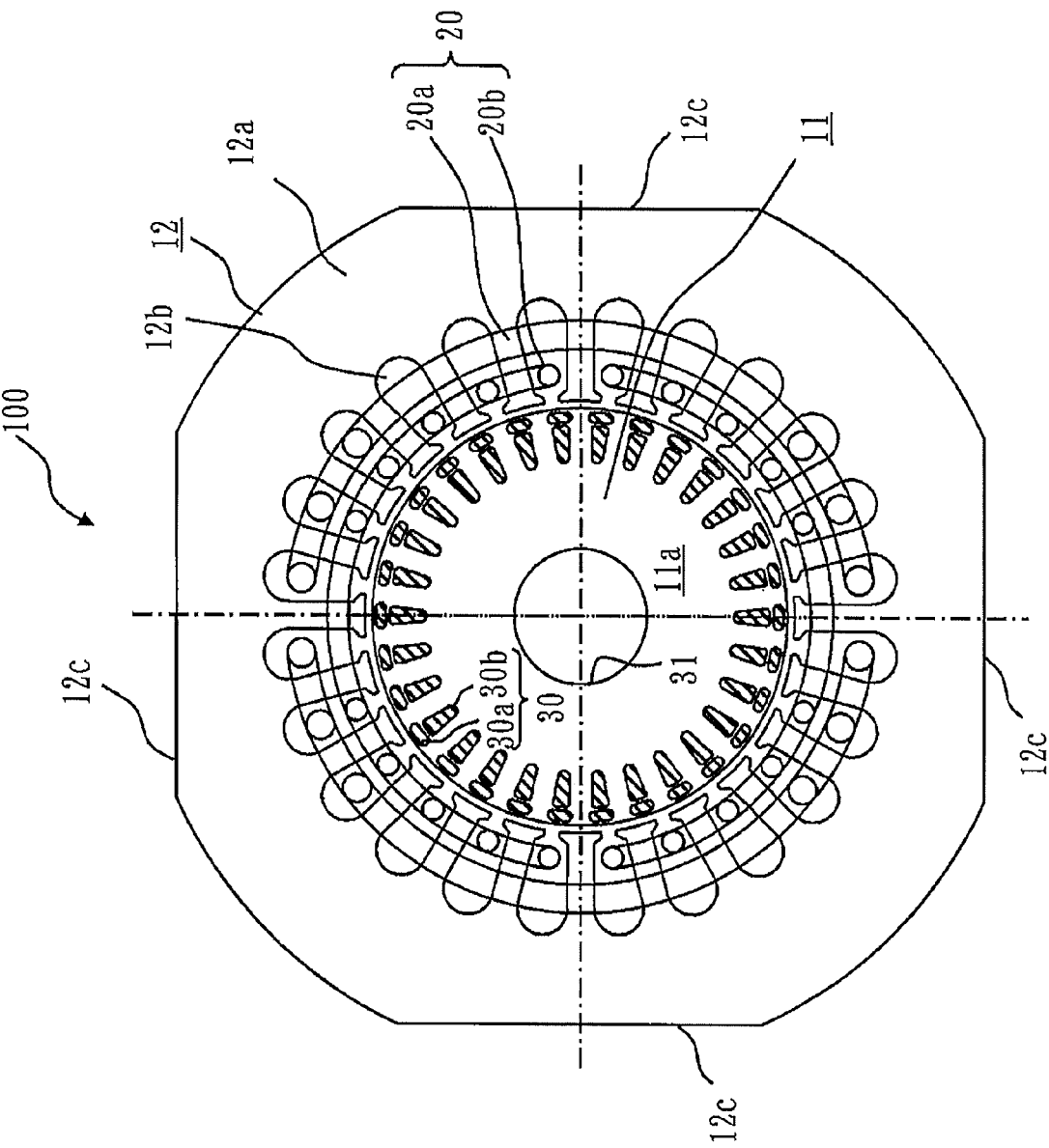
FIG. 1 A horizontal cross-sectional view showing an induction motor 100, in accordance with a first embodiment.
Figure 2:
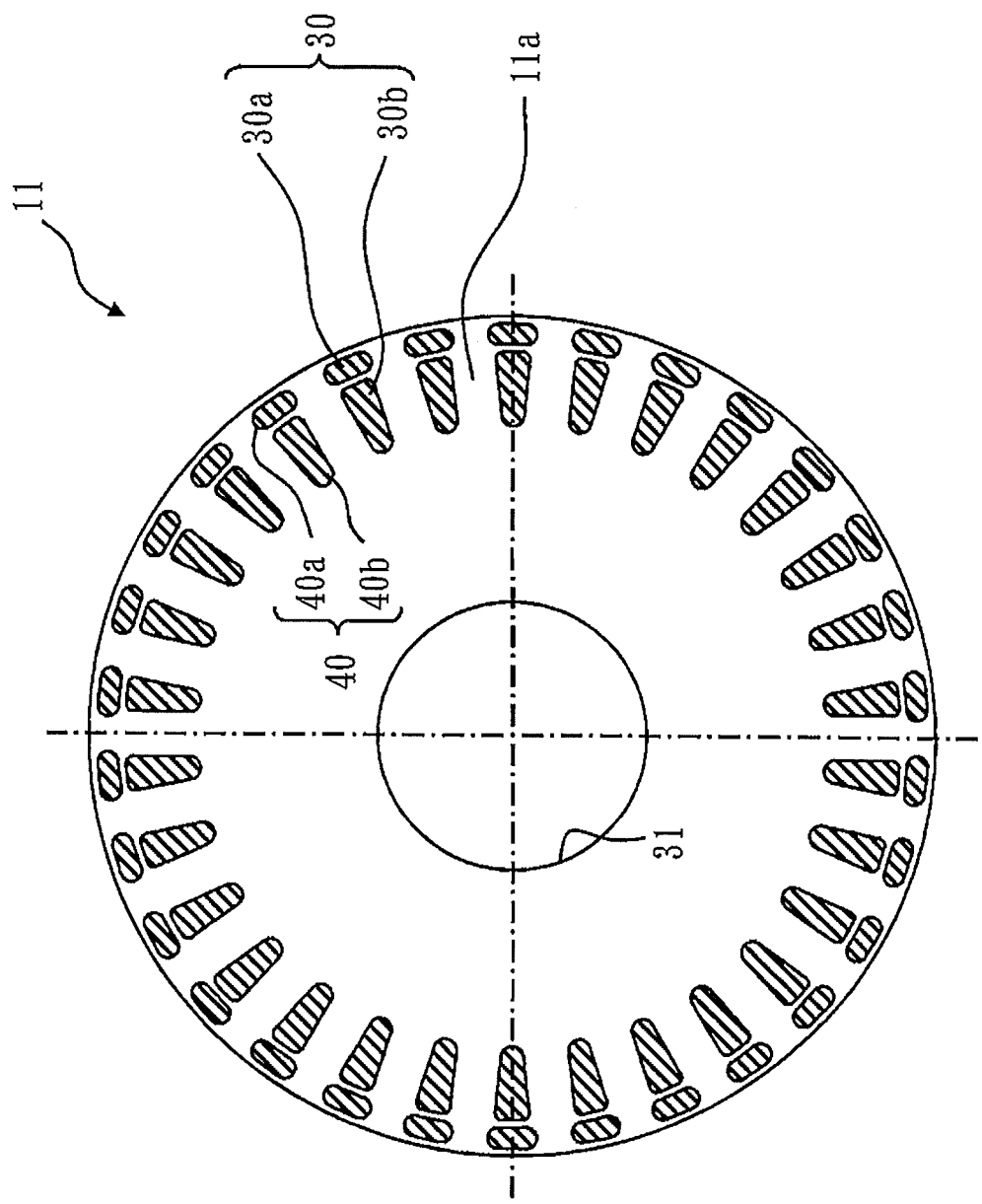
FIG. 2 A cross-sectional view showing a rotor 11 of the induction motor 100, in accordance with the first embodiment.
Figure 3:
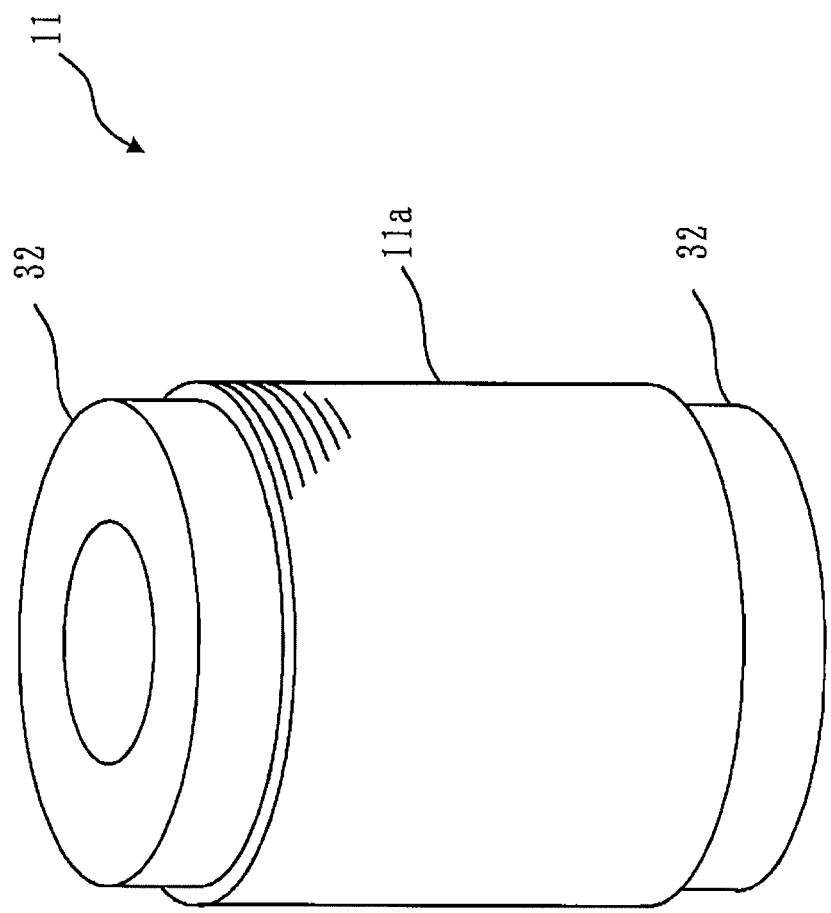
FIG. 3 A perspective view showing the rotor 11 of the induction motor 100, in accordance with the first embodiment.
Figure 4:
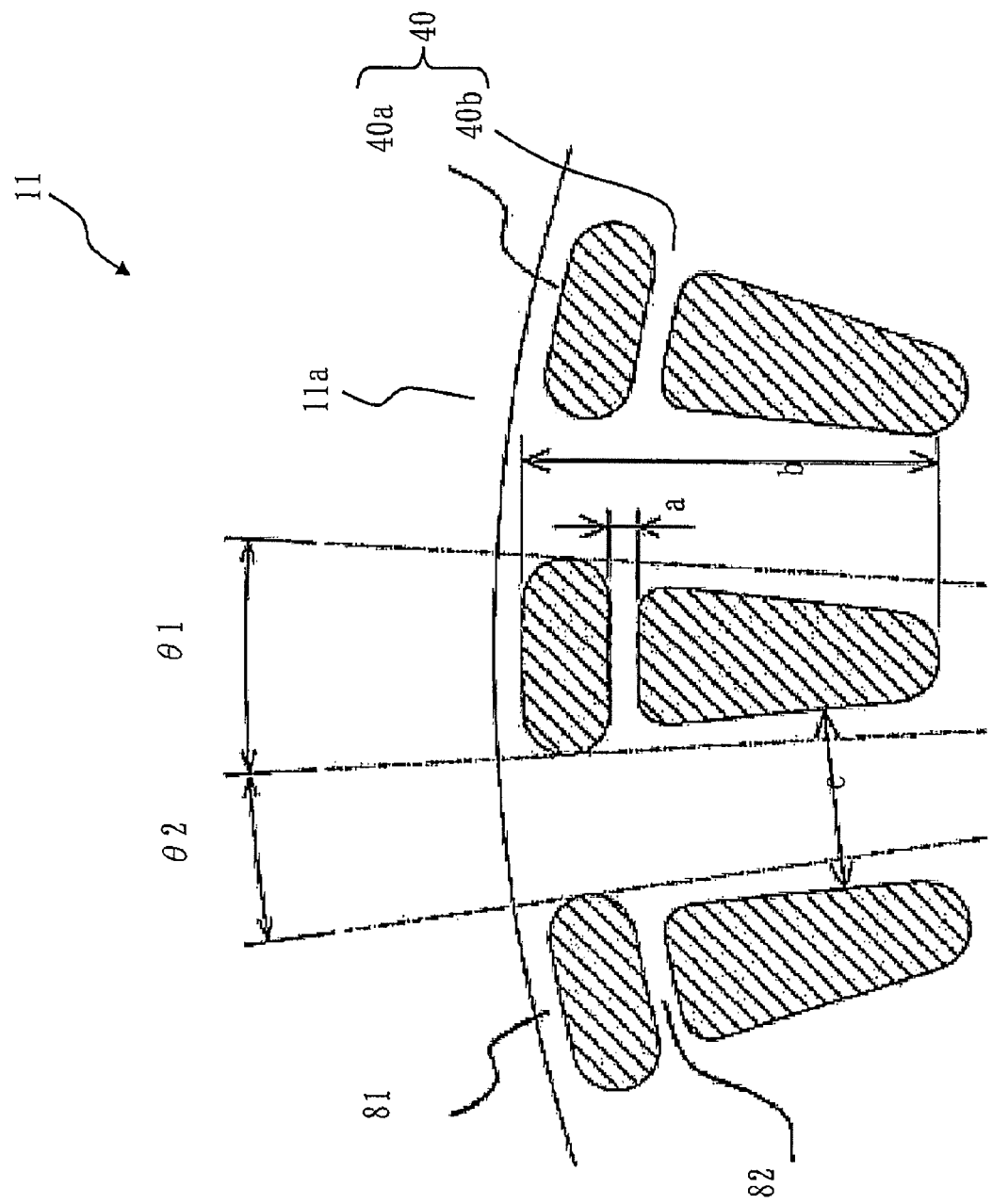
FIG. 4 An enlarged view showing a rotor slot 40 of the rotor 11 of the induction motor 100, in accordance with the first embodiment.
Figure 5:
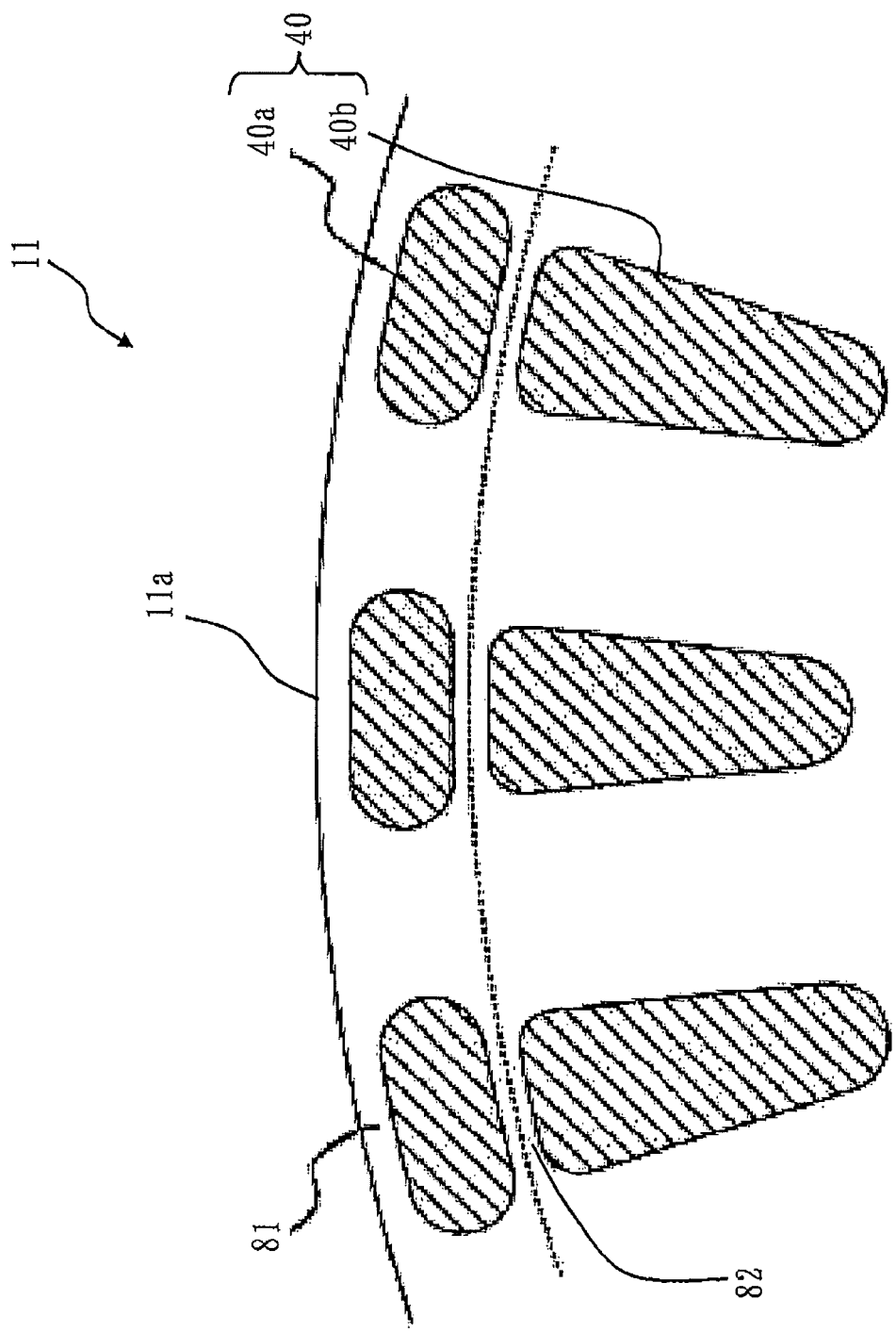
FIG. 5 An enlarged view showing the rotor slot 40 of the rotor 11 of the induction motor 100, in accordance with the first embodiment.
Figure 6:
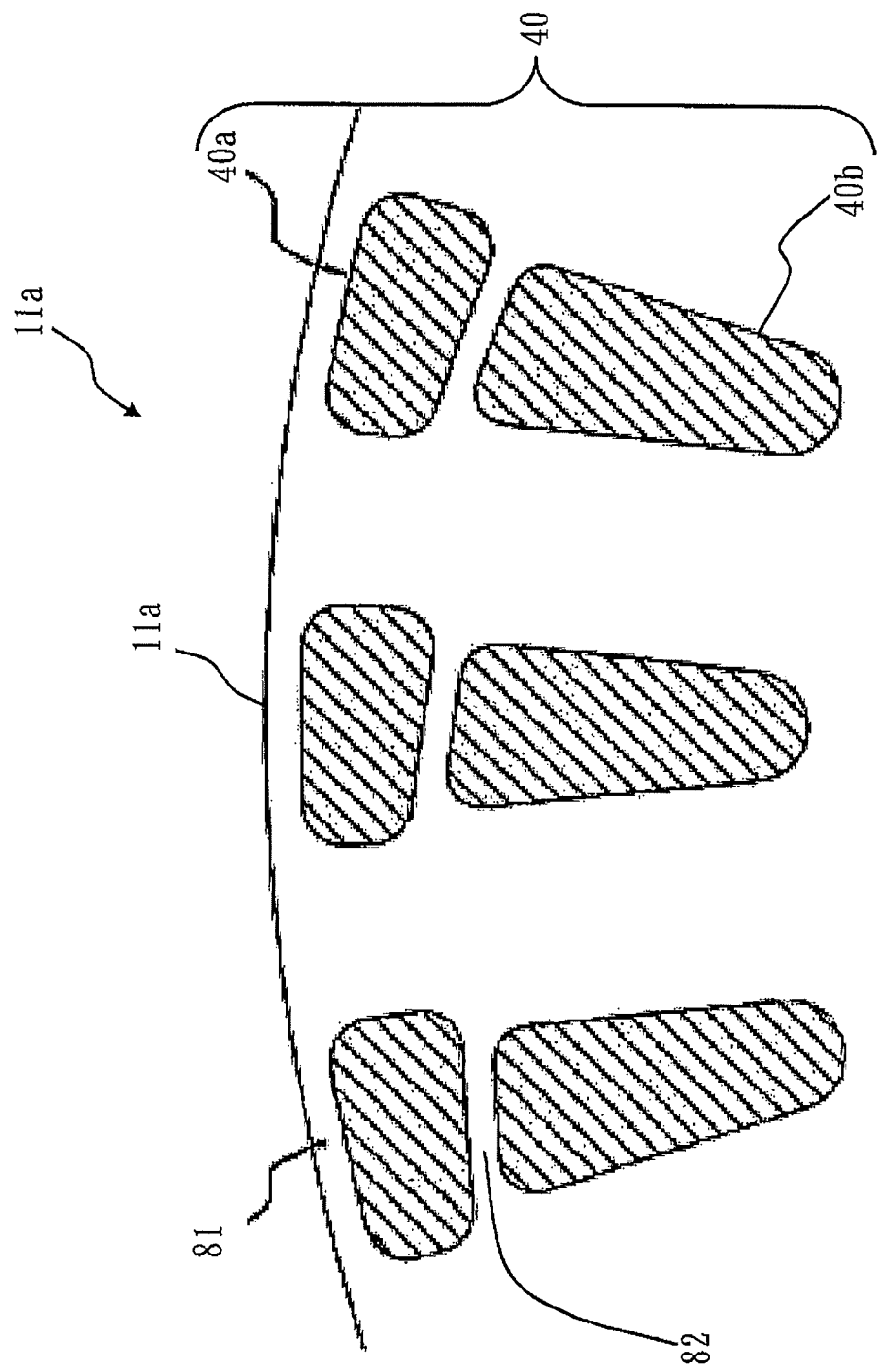
FIG. 6 An enlarged view showing the rotor slot 40 of the rotor 11 of the induction motor 100, in accordance with the first embodiment.
Figure 7:
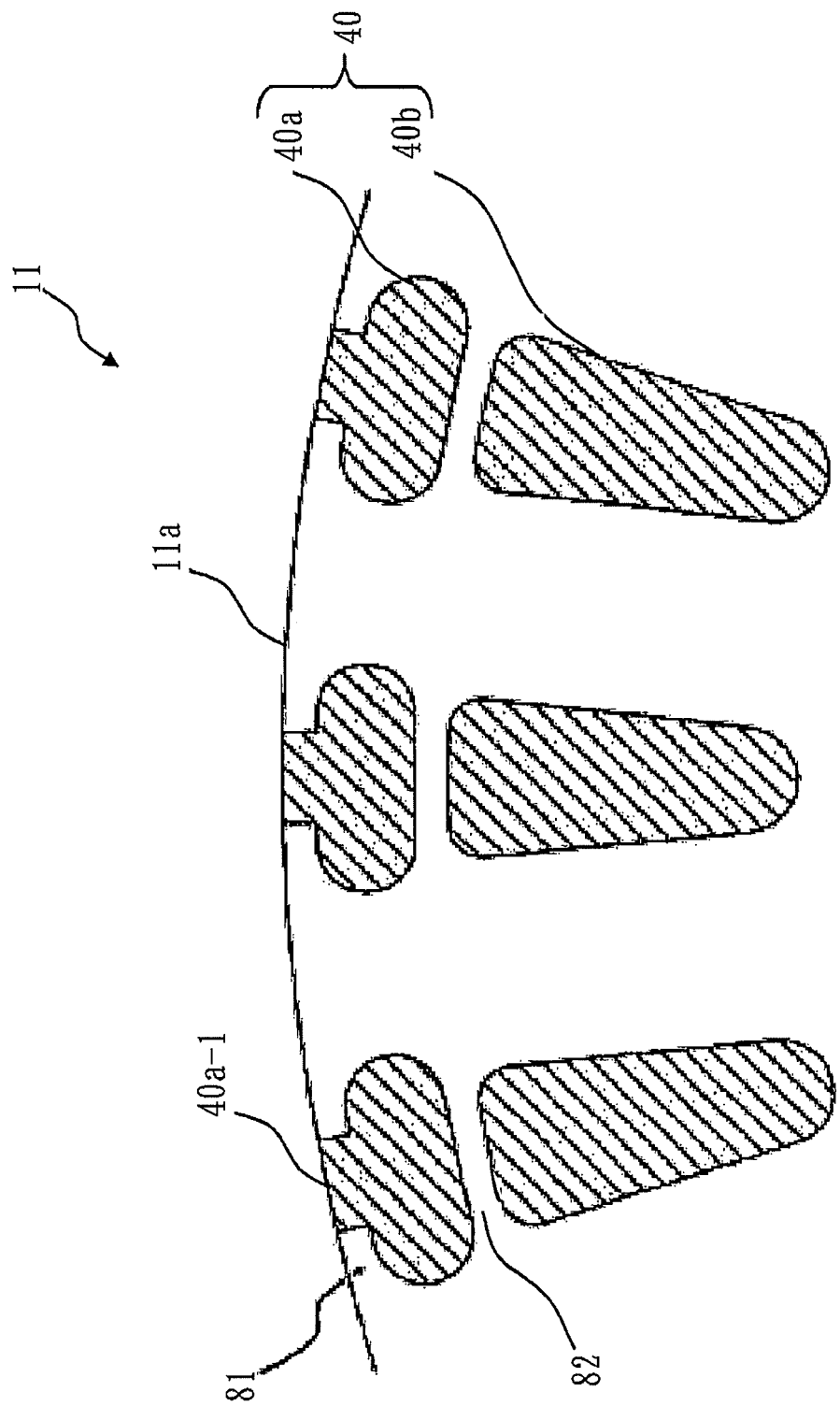
FIG. 7 An enlarged view showing the rotor slot 40 of the rotor 11 of the induction motor 100, in accordance with a second embodiment.
Figure 8:
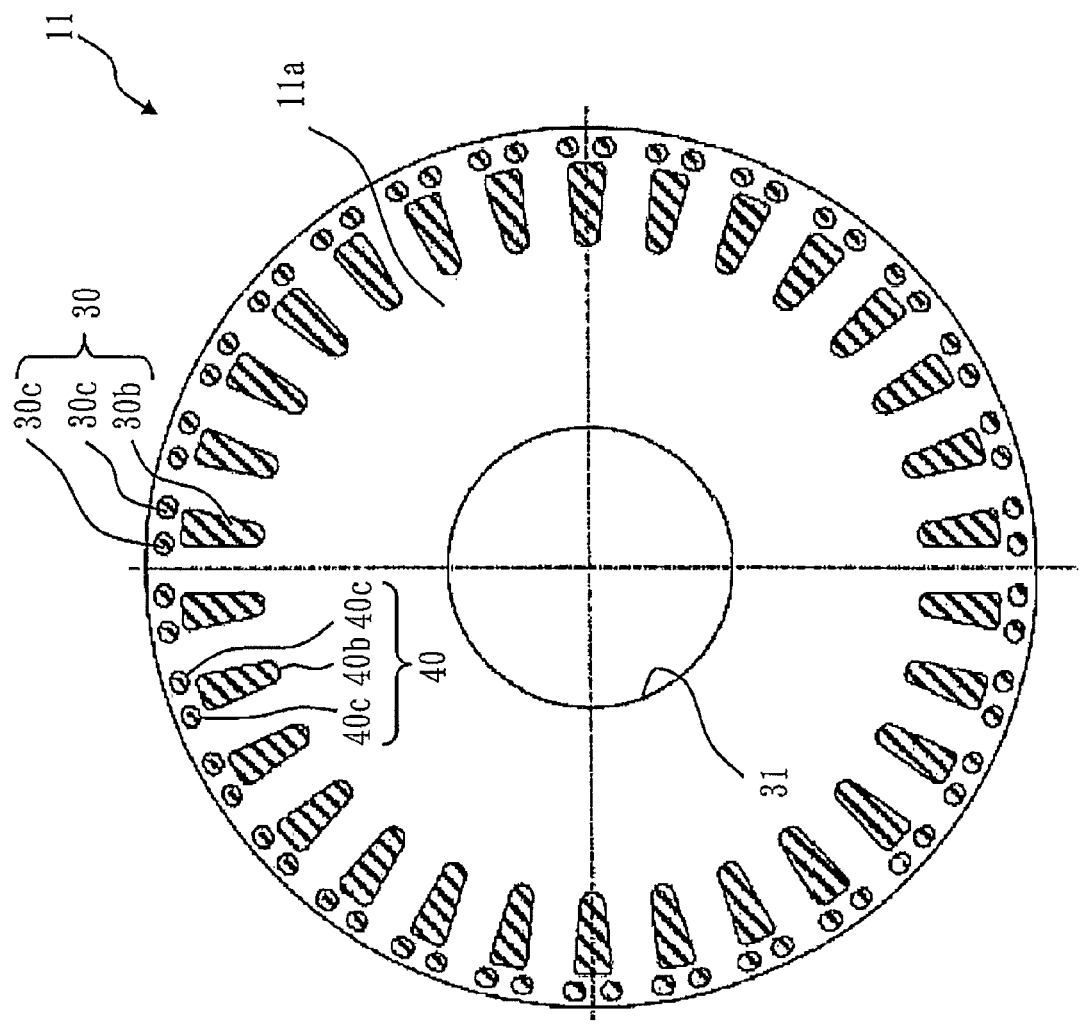
FIG. 8 A horizontal cross-sectional view showing the rotor 11 of the induction motor 100, in accordance with a third embodiment.
Figure 9:
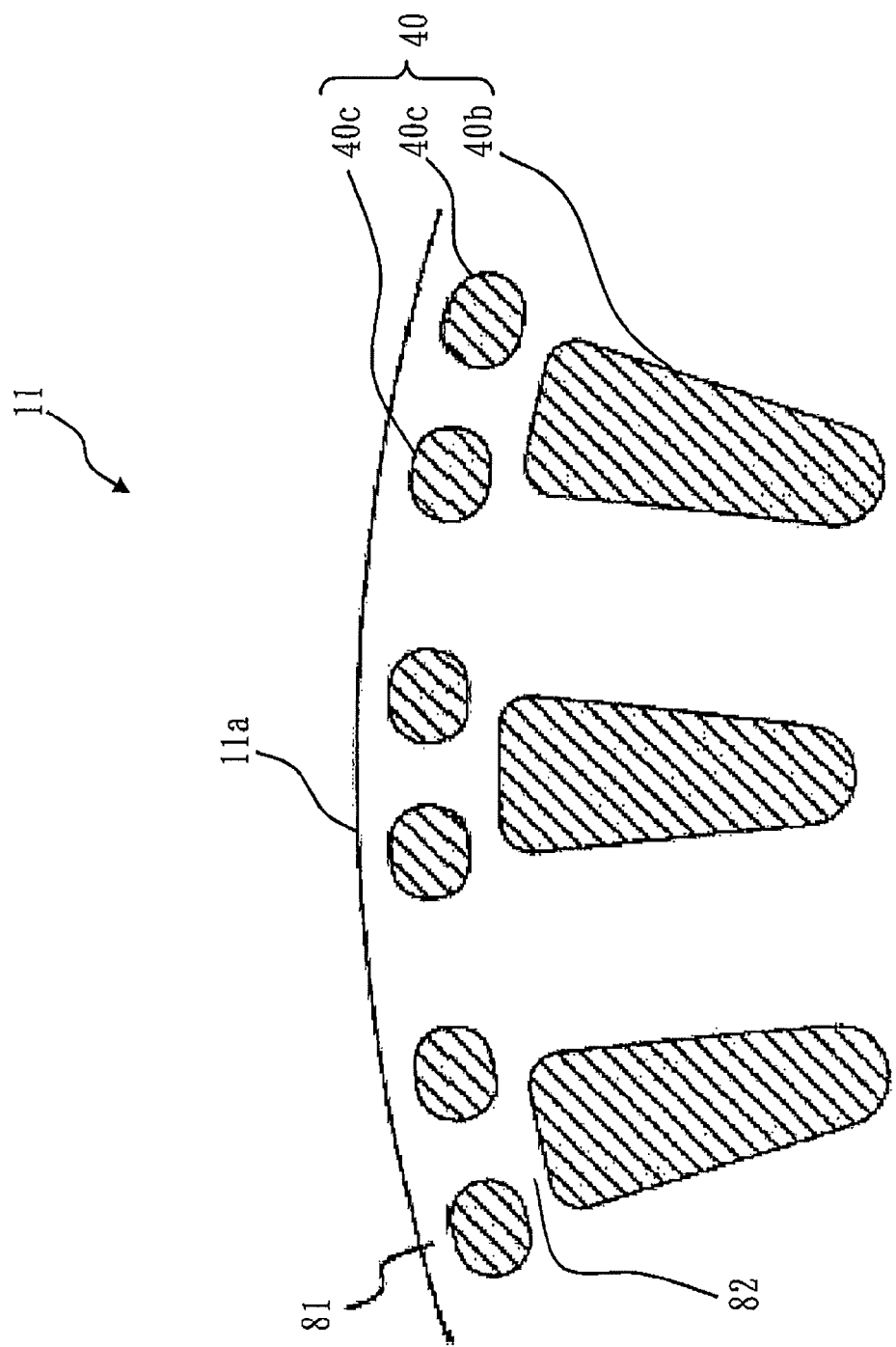
FIG. 9 An enlarged view showing the rotor slot 40 of the rotor 11 of the induction motor 100, in accordance with the third embodiment.
Figure 10:
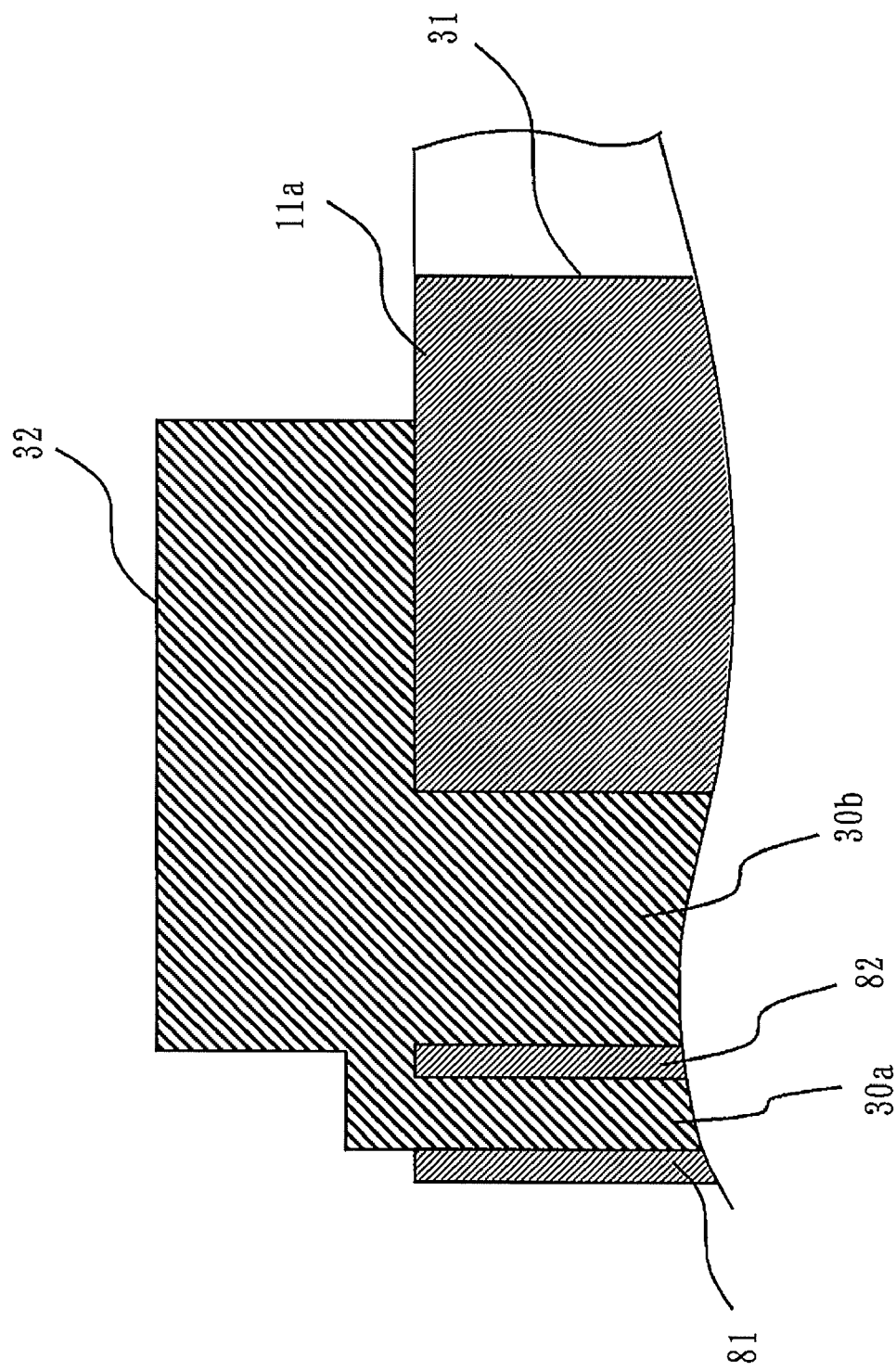
FIG. 10 A partial vertical cross-sectional view of the rotor 11 of the induction motor 100, in accordance with a fourth embodiment.
Figure 11:
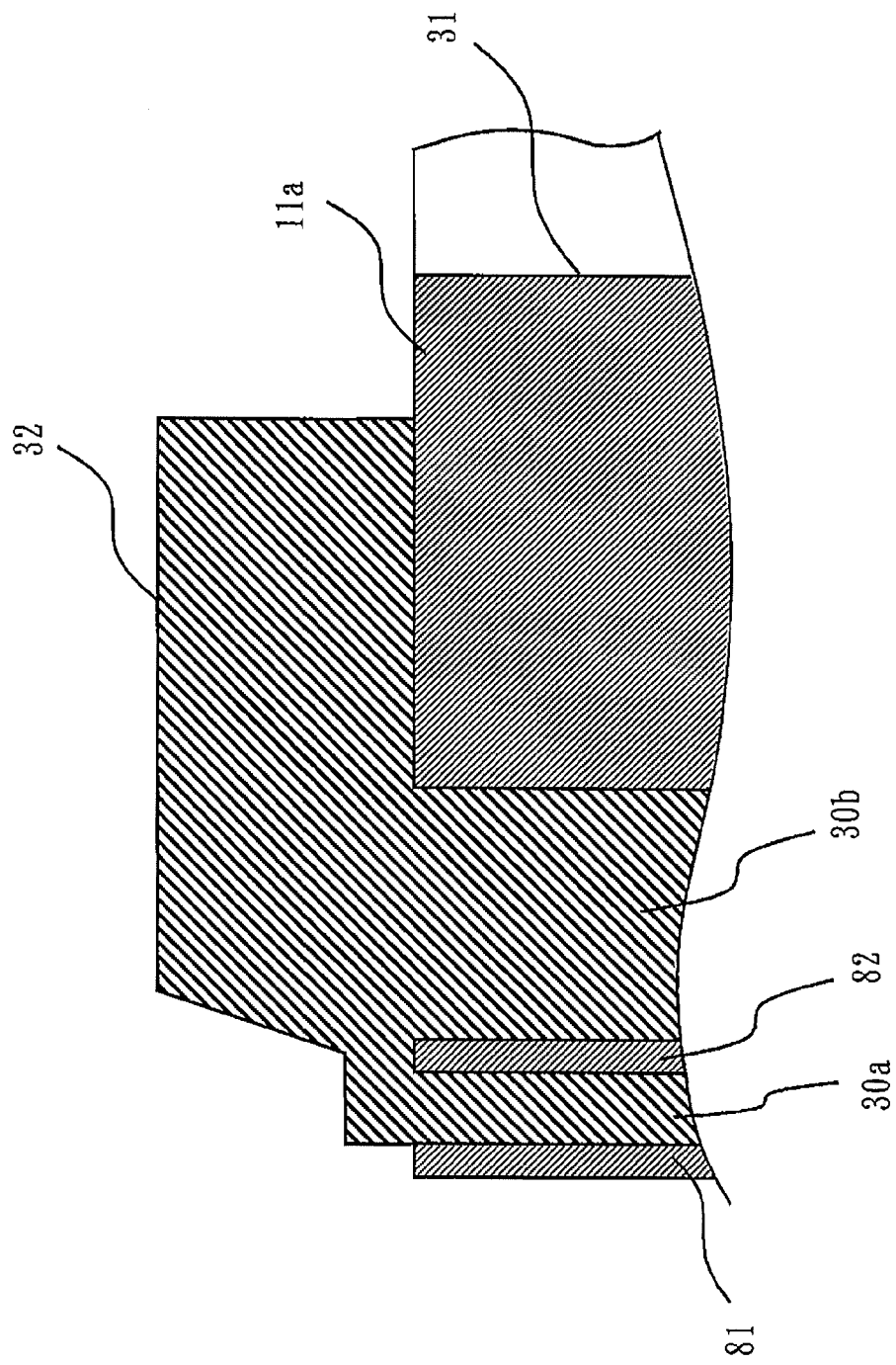
FIG. 11 A partial vertical cross-sectional view of the rotor 11 of the induction motor 100, in accordance with the fourth embodiment.
Figure 12:
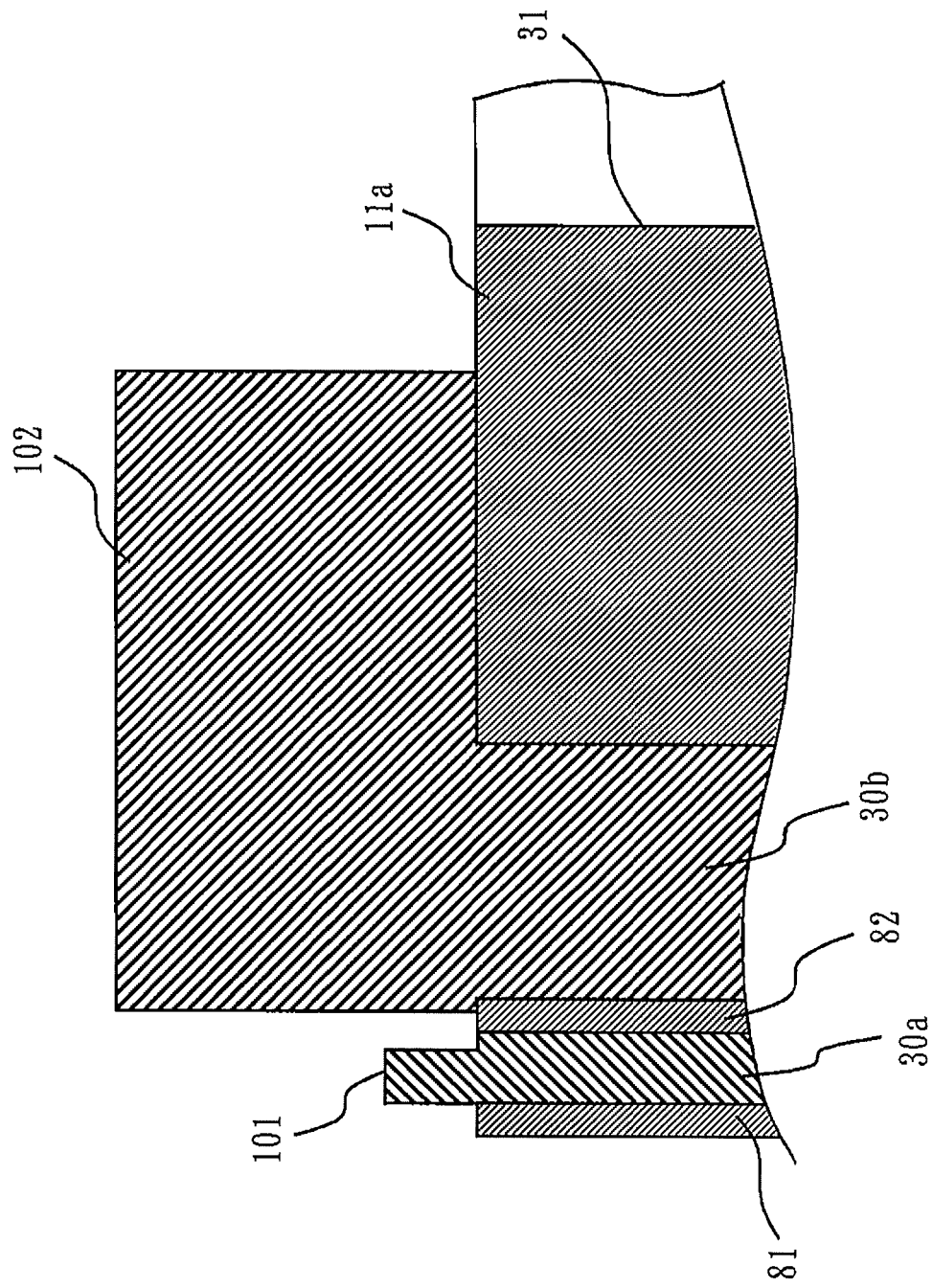
FIG. 12 A partial vertical cross-sectional view of the rotor 11 of the induction motor 100, in accordance with the fourth embodiment.

Rotor 11, rotor core 11*a*, stator 12, stator core 12*a*, stator slot 12*b*, notch 12*c*, winding coil 20, auxiliary winding coil 20*a*, main winding coil 20*b*, aluminum bar 30, outer layer aluminum bar 30*a*, inner layer aluminum bar 30*b*, outer layer aluminum bar 30*c*, axis hole 31, end ring 32, rotor slot 40, outer layer slot 40*a*, opening parts 40*a*-1, inner slot 40*b*, outer layer slot 40*c*, outer peripheral thin bridge 81, inner peripheral thin bridge 82, induction motor 100, outer layer end ring 101, inner layer end ring 102.

What is claimed is:

1. An induction motor having a rotor for forming a double squirrel cage secondary conductor, wherein the rotor comprises:
    a rotor core which is formed by laminating a plurality of electromagnetic steel plates;
    outer layer slots which are filled with an electro-conductive material, and which are mounted along an outer peripheral edge of the rotor core;
    inner layer slots which are filled with an electro-conductive material, and which are disposed at an inner side of the outer layer slots in a radial direction; and
    inner peripheral thin bridges made from the plurality of electromagnetic steel plates, which are disposed in between the outer layer slots and the inner layer slots, and wherein an angle between side faces of the outer layer slots and a center of the rotor is greater than an angle between adjoining side planes of the outer layer slots and the center of the rotor.

2. The induction motor according to claim 1, wherein the outer layer slots have a substantially rectangular shape in which a dimension in a circumferential direction of the rotor core is longer than a dimension in the radial direction of the rotor core.

3. The induction motor according to claim 2, wherein the dimension of the inner peripheral thin bridges in the radial direction of the rotor core is approximately constant in a circumferential direction of the rotor core.

4. The induction motor according to claim 3, wherein the rotor core further includes outer peripheral thin bridges disposed at an outer side of the outer layer slots in the radial direction of the rotor core, the outer peripheral thin bridges having a dimension in the radial direction of the rotor core that is approximately constant in a circumferential direction of the rotor core.

5. The induction motor according to claim 2, wherein the rotor core further includes outer peripheral thin bridges disposed at an outer side of the outer layer slots in the radial direction of the rotor core, the outer peripheral thin bridges having a dimension in the radial direction of the rotor core that is approximately constant in a circumferential direction of the rotor core.

6. The induction motor according to claim 1, wherein the dimension of the inner peripheral thin bridges in the radial direction of the rotor core is approximately constant in a circumferential direction of the rotor core.

7. The induction motor according to claim 6, wherein the rotor core further includes outer peripheral thin bridges disposed at an outer side of the outer layer slots in the radial direction of the rotor core, the outer peripheral thin bridges having a dimension in the radial direction of the rotor core that is approximately constant in a circumferential direction of the rotor core.

8. The induction motor according to claim 1, wherein the rotor core further includes outer peripheral thin bridges disposed at an outer side of the outer layer slots in the radial direction of the rotor core, the outer peripheral thin bridges having a dimension in the radial direction of the rotor core that is approximately constant in a circumferential direction of the rotor core.

9. The induction motor according to claim 8, wherein a part of the outer peripheral thin bridges is opened.

10. The induction motor according to claim 1, wherein the double squirrel-cage secondary conductor includes:
    outer layer conductor bars formed by filling an inside of the outer layer slots with the electro-conductive material,
    inner layer conductor bars formed by filling an inside of the inner layer slots with the electro-conductive material, and
    end rings provided at both end faces of the rotor core in a laminated direction of the rotor core, the end rings having a first part connected to the outer layer conductor bars, a second part connected to the inner layer conductor bars, and a step provided between the first part and the second part.

11. The induction motor according to claim 10, wherein a height of the first part of the end rings is lower than a height of the second part of the end rings.

12. The induction motor according to claim 1, wherein the double squirrel-cage secondary conductor includes
    outer layer conductor bars formed by filling an inside of the outer layer slots with the electro-conductive material,
    inner layer conductor bars formed by filling an inside of the inner layer slots with the electro-conductive material,
    outer layer end rings which are provided at both end faces of the rotor core in a laminated direction of the rotor core, and which are connected to the outer layer conductor bars and are not connected to the inner layer conductor bars, and inner layer end rings which are provided at both end faces of the rotor core in a laminated direction of the rotor core, and which are connected to the inner layer conductor bars and are not connected to the outer layer conductor bars.

13. The induction motor according to claim 12, wherein the electro-conductive material forming the inner layer conductor bars is lower in resistance than the electro-conductive material forming the outer layer conductor bars.

14. An induction motor according to claim 1, wherein the inner layer slots are disposed inside of an angle between side faces of the outer layer slots and a center of the rotor.

15. A hermetic compressor comprising the induction motor of claim 14.

16. A hermetic compressor comprising the induction motor of claim 1.

* * * * *